US011924627B2

(12) United States Patent
Laaksonen

(10) Patent No.: US 11,924,627 B2
(45) Date of Patent: Mar. 5, 2024

(54) AMBIENCE AUDIO REPRESENTATION AND ASSOCIATED RENDERING

(71) Applicant: Nokia Technologies Oy, Espoo (FI)

(72) Inventor: Lasse Laaksonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 299 days.

(21) Appl. No.: 17/295,254

(22) PCT Filed: Nov. 18, 2019

(86) PCT No.: PCT/FI2019/050825

§ 371 (c)(1),
(2) Date: May 19, 2021

(87) PCT Pub. No.: WO2020/104726

PCT Pub. Date: May 28, 2020

(65) Prior Publication Data

US 2021/0400413 A1 Dec. 23, 2021

(30) Foreign Application Priority Data

Nov. 21, 2018 (GB) .................................... 1818959

(51) Int. Cl.
*H04S 7/00* (2006.01)
*G10L 25/21* (2013.01)
(Continued)

(52) U.S. Cl.
CPC .............. *H04S 7/303* (2013.01); *G10L 25/21* (2013.01); *H04R 1/406* (2013.01); *H04R 3/005* (2013.01);
(Continued)

(58) Field of Classification Search
CPC ....... G10L 25/21; G10L 19/008; H04R 1/406; H04R 3/005; H04R 5/027; H04S 7/303;
(Continued)

(56) References Cited

U.S. PATENT DOCUMENTS

2011/0264450 A1 10/2011 Janse et al. .................. 704/228
2014/0247945 A1 9/2014 Ramo et al. ................... 381/17
(Continued)

FOREIGN PATENT DOCUMENTS

CN 102164328 A 8/2011
CN 104054126 A 9/2014
(Continued)

OTHER PUBLICATIONS

Axel, Six Degree of Freedom Binaural Audio Reproduction of First ORder ambisonic with distance information, Aug. 2018.*
(Continued)

*Primary Examiner* — William A Jerez Lora
(74) *Attorney, Agent, or Firm* — Harrington & Smith

(57) ABSTRACT

An apparatus including circuitry configured for: defining at least one ambience audio representation, the ambience audio representation includes at least one respective diffuse background audio signal and at least one parameter, the at least one parameter associated with the at least one respective diffuse background audio signal and further associated with at least one frequency range or at least one part of the frequency range, at least one time period or at least one part of the time period and a directional range for a defined position within an audio field, wherein the at least one ambience component representation is configured to be used in rendering an ambiance audio signal by a 6-degrees-of-freedom or enhanced 3-degrees-of-freedom Tenderer by processing, based on the at least one ambience audio representation and a listener position and/or direction, the respective diffuse background audio signal.

18 Claims, 11 Drawing Sheets

(51) Int. Cl.

| | |
|---|---|
| ***H04R 1/40*** | (2006.01) |
| ***H04R 3/00*** | (2006.01) |
| ***H04R 5/027*** | (2006.01) |
| ***H04S 3/00*** | (2006.01) |
| *G10L 19/008* | (2013.01) |

(52) U.S. Cl.

CPC ............. *H04R 5/027* (2013.01); *H04S 3/008* (2013.01); *G10L 19/008* (2013.01); *H04S 2400/03* (2013.01); *H04S 2400/11* (2013.01); *H04S 2400/15* (2013.01); *H04S 2420/03* (2013.01); *H04S 2420/11* (2013.01)

(58) Field of Classification Search

CPC .. H04S 3/008; H04S 2400/03; H04S 2400/11; H04S 2400/15; H04S 2420/03; H04S 2420/11

USPC ............................ 381/1, 2, 56, 58, 310, 303

See application file for complete search history.

(56) References Cited

U.S. PATENT DOCUMENTS

| | | | | |
|---|---|---|---|---|
| 2016/0255452 | A1* | 9/2016 | Nowak | G10L 19/008 381/17 |
| 2018/0068664 | A1* | 3/2018 | Seo | H04S 3/008 |
| 2018/0206057 | A1 | 7/2018 | Kim et al. | 7/304 |
| 2019/0098425 | A1* | 3/2019 | Habets | H04S 3/008 |
| 2019/0335291 | A1* | 10/2019 | Baque | H04S 3/02 |

FOREIGN PATENT DOCUMENTS

| | | | |
|---|---|---|---|
| CN | 104995681 | A | 10/2015 |
| CN | 105191354 | A | 12/2015 |
| EP | 2 346 028 | A1 | 7/2011 |
| EP | 2805326 | A1 | 7/2013 |
| EP | 2 733 965 | A1 | 5/2014 |
| EP | 2997742 | A | 11/2014 |
| FR | 2977335 | A1 | 1/2013 |
| GB | 2561596 | A | 10/2018 |
| WO | WO 2005/101905 | A1 | 10/2005 |
| WO | WO-2013/111034 | A2 | 8/2013 |
| WO | WO-2014/036121 | A1 | 3/2014 |
| WO | WO-2016/004277 | A1 | 1/2016 |
| WO | WO-2017/220854 | A1 | 12/2017 |
| WO | WO-2018/056780 | A1 | 3/2018 |

OTHER PUBLICATIONS

Mikko_Parametric Time-Frequency Representation of Spatial Sound in Virtual Worlds, Jun. 2012.*

Laitinen, Mikko-Ville, et al., "Parametric Time-Frequency Representation of Spatial in Virtual Worlds", Jun. 2012, ACM Transactions on Applied Perception, abstract, 1 pg.

Politis, Archontis, et al., "Compass: Coding and Multidirectional Parameterization onAmbisonic Sound Scenes", Sep. 13, 2018, IEEE, 5 pgs.

* cited by examiner 100
102
Multi-channel signals
121
103
Transport Signal Generator
Analysis processor
105
Transport signals
104
109
106
Metadata: Directions, Energy ratios, Coherence
110
108
112
107
Audio encoder core
Metadata encoder/ quantizer
111
Potential transmission or storage (Bitstream)
131
133
135
Transport extractor
Metadata extractor
137
139
Synthesis processor
110
Multi-channel signals

AMBIENCE AUDIO REPRESENTATION AND ASSOCIATED RENDERING

CROSS REFERENCE TO RELATED APPLICATION

This patent application is a U.S. National Stage application of International Patent Application Number PCT/FI2019/050825 filed Nov. 18, 2019, which is hereby incorporated by reference in its entirety, and claims priority to GB 1818959.7 filed Nov. 21, 2018.

FIELD

The present application relates to apparatus and methods for sound-field related ambience audio representation and associated rendering, but not exclusively for ambience audio representation for an audio encoder and decoder.

BACKGROUND

Immersive media technologies are being standardised by MPEG under the name MPEG-I. This includes methods for various virtual reality (VR), augmented reality (AR) or mixed reality (MR) use cases. MPEG-I is divided into three phases: Phases 1a, 1b, and 2. The phases are characterized by how the so-called degrees of freedom in 3D space are considered. Phases 1a and 1b consider 3DoF and 3DoF+ use cases, and Phase 2 will then allow at least significantly unrestricted 6DoF.

In a 3D space, there are in total six degrees of freedom defining the way the user may move within said space. This movement is divided into two categories: rotational and translational movement (with three degrees of freedom each). Rotational movement is sufficient for a simple VR experience where the user may turn her head (pitch, yaw, and roll) to experience the space from a static point or along an automatically moving trajectory. Translational movement means that the user may also change the position of the rendering, i.e., move along the x, y, and z axes according to their wishes. Free-viewpoint AR/VR experiences allow for both rotational and translational movements. It is common to talk about the various degrees of freedom and the related experiences using the terms 3DoF, 3DoF+ and 6DoF, as mentioned above. 3DoF+ falls somewhat between 3DoF and 6DoF. It allows for some limited user movement, e.g., it can be considered to implement a restricted 6DoF where the user is sitting down but can lean their head in various directions.

Parametric spatial audio processing is a field of audio signal processing where the spatial aspects of the sound are described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

Directional or object-based 6DoF audio is generally well understood. It works particularly well for many types of produced content. Live capture, or combining live capture and produced content, however require more capture-specific approaches, which are generally not at least fully object-based. For example, one may consider Ambisonics (FOA/HOA) capture or an immersive capture utilizing a parametric analysis for at least ambience signal capture and representation. These formats can be of value also for representing existing legacy content in a 6DoF environment. Furthermore, mobile-based capture can become increasingly important for user-generated immersive content. Such capture often produces a parametric audio scene representation. In general, thus, object-based audio is not sufficient to cover all use cases, possibilities in capture, and utilization of legacy audio content.

SUMMARY

There is provided according to a first aspect an apparatus comprising means for: defining at least one ambience audio representation, the ambience audio representation comprises at least one respective diffuse background audio signal and at least one parameter, the at least one parameter associated with the at least one respective diffuse background audio signal and further associated with at least one frequency range or at least one part of the frequency range, at least onetime period or at least one part of the time period and a directional range for a defined position within an audio field, wherein the at least one ambience component representation is configured to be used in rendering an ambiance audio signal by a 6-degrees-of-freedom or enhanced 3-degrees-of-freedom renderer by processing, based on the at least one ambience audio representation and a listener position and/or direction, the respective diffuse background audio signal.

The directional range may define a range of angles.

The ambience audio representation at least one parameter may further comprise at least one of: a minimum distance threshold, over which the at least one ambience component representation is configured to be used in rendering the ambiance audio signal; a maximum distance threshold, under which the at least one ambience component representation is configured to be used in rendering the ambiance audio signal; a distance weighting function, to be used in rendering the ambiance audio signal by the 6-degrees-of-freedom or enhanced 3-degrees-of-freedom renderer by processing, based on the at least one ambience audio representation and the listener position and/or direction, the respective diffuse background audio signal.

The means for defining at least one ambience audio representation may be further for: obtaining at least two audio signals captured by a first microphone array; analysing the at least two audio signals to determine at least one energy parameter; obtaining at least one close audio signal associated with an audio source; removing directional audio components associated with the at least one close audio signal from the at least one energy parameter to generate the at least one parameter.

The means may be further for generating the at least one respective diffuse background audio signal, based on the at least two audio signals captured by a first microphone array and the at least one close audio signal.

The means for generating the at least one respective diffuse background audio signal may be further for at least one of: downmixing the at least two audio signals captured by a first microphone array; selecting at least one audio signal from the at least two audio signals captured by a first microphone array; beamforming the at least two audio signals captured by a first microphone array.

According to a second aspect there is provided an apparatus comprising means for: obtaining at least one ambience audio representation, the ambience audio representation comprising at least one respective diffuse background audio signal and at least one parameter, the at least one parameter associated with the at least one respective diffuse background audio signal and further associated with at least one frequency range or at least one part of the frequency range, at least one time period or at least one part of the time period and a directional range for a defined position within an audio field; obtaining at least one listener position and/or orientation within a 6-degrees-of-freedom or enhanced 3-degrees-of-freedom audio field; rendering at least one ambiance audio signal by processing the at least one respective diffuse background audio signal based on the at least one parameter and the listener position and/or orientation within the 6-degrees-of-freedom or enhanced 3-degrees-of-freedom audio field.

The means for obtaining at least one listener position and/or orientation within a 6-degrees-of-freedom or enhanced 3-degrees-of-freedom audio field may be further for at least one of determining a listener position relative to the defined position with the audio field based on the at least one listener position and/or orientation within a 6-degrees-of-freedom or enhanced 3-degrees-of-freedom audio field and the defined position parameter, wherein means for rendering at least one ambiance audio signal by processing the at least one respective diffuse background audio signal based on the at least one parameter and the listener position and/or orientation within the 6-degrees-of-freedom or enhanced 3-degrees-of-freedom audio field may be further for at least one of: rendering the ambiance audio signal based on a distance defined by the a listener position relative to the defined position with the audio field being over a minimum distance threshold; rendering the ambiance audio signal based on a distance defined by the a listener position relative to the defined position with the audio field being under a maximum distance threshold; rendering the ambiance audio signal based on a distance weighting function applied to a distance defined by the a listener position relative to the defined position with the audio field.

The means for obtaining at least one listener position and/or orientation within a 6-degrees-of-freedom or enhanced 3-degrees-of-freedom audio field may be further for determining a listener position orientation relative to the defined position with the audio field based on the at least one listener position within a 6-degrees-of-freedom or enhanced 3-degrees-of-freedom audio field and the defined position parameter, wherein means for rendering at least one ambiance audio signal by processing the at least one respective diffuse background audio signal based on the at least one parameter and the listener position and/or orientation within the 6-degrees-of-freedom or enhanced 3-degrees-of-freedom audio field may be further for rendering the ambiance audio signal based on the a listener position orientation relative to the defined position being within the directional range.

According to a third aspect there is provided a method comprising: defining at least one ambience audio representation, the ambience audio representation comprises at least one respective diffuse background audio signal and at least one parameter, the at least one parameter associated with the at least one respective diffuse background audio signal and further associated with at least one frequency range or at least one part of the frequency range, at least onetime period or at least one part of the time period and a directional range for a defined position within an audio field, wherein the at least one ambience component representation is configured to be used in rendering an ambiance audio signal by a 6-degrees-of-freedom or enhanced 3-degrees-of-freedom renderer by processing, based on the at least one ambience audio representation and a listener position and/or direction, the respective diffuse background audio signal.

The directional range may define a range of angles.

The ambience audio representation at least one parameter may further comprise at least one of: a minimum distance threshold, over which the at least one ambience component representation is configured to be used in rendering the ambiance audio signal; a maximum distance threshold, under which the at least one ambience component representation is configured to be used in rendering the ambiance audio signal; a distance weighting function, to be used in rendering the ambiance audio signal by the 6-degrees-of-freedom or enhanced 3-degrees-of-freedom renderer by processing, based on the at least one ambience audio representation and the listener position and/or direction, the respective diffuse background audio signal.

Defining at least one ambience audio representation may be further for: obtaining at least two audio signals captured by a first microphone array; analysing the at least two audio signals to determine at least one energy parameter; obtaining at least one close audio signal associated with an audio source; removing directional audio components associated with the at least one close audio signal from the at least one energy parameter to generate the at least one parameter.

The method may further comprise generating the at least one respective diffuse background audio signal, based on the at least two audio signals captured by a first microphone array and the at least one close audio signal.

Generating the at least one respective diffuse background audio signal may further comprise at least one of: downmixing the at least two audio signals captured by a first microphone array; selecting at least one audio signal from the at least two audio signals captured by a first microphone array; beamforming the at least two audio signals captured by a first microphone array.

According to a fourth aspect there is provided a method comprising: obtaining at least one ambience audio representation, the ambience audio representation comprising at least one respective diffuse background audio signal and at least one parameter, the at least one parameter associated with the at least one respective diffuse background audio signal and further associated with at least one frequency range or at least one part of the frequency range, at least one time period or at least one part of the time period and a directional range for a defined position within an audio field; obtaining at least one listener position and/or orientation within a 6-degrees-of-freedom or enhanced 3-degrees-of-freedom audio field; rendering at least one ambiance audio signal by processing the at least one respective diffuse background audio signal based on the at least one parameter and the listener position and/or orientation within the 6-degrees-of-freedom or enhanced 3-degrees-of-freedom audio field.

Obtaining at least one listener position and/or orientation within a 6-degrees-of-freedom or enhanced 3-degrees-of-freedom audio field may further comprise determining a listener position relative to the defined position with the audio field based on the at least one listener position and/or orientation within a 6-degrees-of-freedom or enhanced 3-degrees-of-freedom audio field and the defined position parameter, wherein rendering at least one ambiance audio signal by processing the at least one respective diffuse background audio signal based on the at least one parameter and the listener position and/or orientation within the 6-degrees-of-freedom or enhanced 3-degrees-of-freedom audio field may further comprise at least one of: rendering the ambiance audio signal based on a distance defined by the a listener position relative to the defined position with the audio field being over a minimum distance threshold; rendering the ambiance audio signal based on a distance defined by the a listener position relative to the defined position with the audio field being under a maximum distance threshold; rendering the ambiance audio signal based on a distance weighting function applied to a distance defined by the a listener position relative to the defined position with the audio field.

Obtaining at least one listener position and/or orientation within a 6-degrees-of-freedom or enhanced 3-degrees-of-freedom audio field may further comprise at least one of determining a listener position orientation relative to the defined position with the audio field based on the at least one listener position within a 6-degrees-of-freedom or enhanced 3-degrees-of-freedom audio field and the defined position parameter, wherein rendering at least one ambiance audio signal by processing the at least one respective diffuse background audio signal based on the at least one parameter and the listener position and/or orientation within the 6-degrees-of-freedom or enhanced 3-degrees-of-freedom audio field may further comprise rendering the ambiance audio signal based on the a listener position orientation relative to the defined position being within the directional range.

According to a fifth aspect there is provided an apparatus comprising at least one processor and at least one memory including a computer program code, the at least one memory and the computer program code configured to, with the at least one processor, cause the apparatus at least to: define at least one ambience audio representation, the ambience audio representation comprises at least one respective diffuse background audio signal and at least one parameter, the at least one parameter associated with the at least one respective diffuse background audio signal and further associated with at least one frequency range or at least one part of the frequency range, at least onetime period or at least one part of the time period and a directional range for a defined position within an audio field, wherein the at least one ambience component representation is configured to be used in rendering an ambiance audio signal by a 6-degrees-of-freedom or enhanced 3-degrees-of-freedom renderer by processing, based on the at least one ambience audio representation and a listener position and/or direction, the respective diffuse background audio signal.

The directional range may define a range of angles.

The ambience audio representation at least one parameter may further comprise at least one of: a minimum distance threshold, over which the at least one ambience component representation is configured to be used in rendering the ambiance audio signal; a maximum distance threshold, under which the at least one ambience component representation is configured to be used in rendering the ambiance audio signal; a distance weighting function, to be used in rendering the ambiance audio signal by the 6-degrees-of-freedom or enhanced 3-degrees-of-freedom renderer by processing, based on the at least one ambience audio representation and the listener position and/or direction, the respective diffuse background audio signal.

The apparatus caused to define at least one ambience audio representation may be further be caused to: obtain at least two audio signals captured by a first microphone array; analyse the at least two audio signals to determine at least one energy parameter; obtain at least one close audio signal associated with an audio source; remove directional audio components associated with the at least one close audio signal from the at least one energy parameter to generate the at least one parameter.

The apparatus may be further caused to generate the at least one respective diffuse background audio signal, based on the at least two audio signals captured by a first microphone array and the at least one close audio signal.

The apparatus caused to generate the at least one respective diffuse background audio signal may further be caused to perform at least one of: downmix the at least two audio signals captured by a first microphone array; select at least one audio signal from the at least two audio signals captured by a first microphone array; beamform the at least two audio signals captured by a first microphone array.

According to a sixth aspect there is provided an apparatus comprising at least one processor and at least one memory including a computer program code, the at least one memory and the computer program code configured to, with the at least one processor, cause the apparatus at least to: obtain at least one ambience audio representation, the ambience audio representation comprising at least one respective diffuse background audio signal and at least one parameter, the at least one parameter associated with the at least one respective diffuse background audio signal and further associated with at least one frequency range or at least one part of the frequency range, at least one time period or at least one part of the time period and a directional range for a defined position within an audio field; obtain at least one listener position and/or orientation within a 6-degrees-of-freedom or enhanced 3-degrees-of-freedom audio field; and render at least one ambiance audio signal by processing the at least one respective diffuse background audio signal based on the at least one parameter and the listener position and/or orientation within the 6-degrees-of-freedom or enhanced 3-degrees-of-freedom audio field.

The apparatus caused to obtain at least one listener position and/or orientation within a 6-degrees-of-freedom or enhanced 3-degrees-of-freedom audio field may further be caused to determine a listener position relative to the defined position with the audio field based on the at least one listener position and/or orientation within a 6-degrees-of-freedom or enhanced 3-degrees-of-freedom audio field and the defined position parameter, wherein the apparatus caused to render at least one ambiance audio signal by processing the at least one respective diffuse background audio signal based on the at least one parameter and the listener position and/or orientation within the 6-degrees-of-freedom or enhanced 3-degrees-of-freedom audio field may further be caused to perform at least one of: render the ambiance audio signal based on a distance defined by the a listener position relative to the defined position with the audio field being over a minimum distance threshold; render the ambiance audio signal based on a distance defined by the a listener position relative to the defined position with the audio field being under a maximum distance threshold; render the ambiance audio signal based on a distance weighting function applied to a distance defined by the a listener position relative to the defined position with the audio field.

The apparatus caused to obtain at least one listener position and/or orientation within a 6-degrees-of-freedom or enhanced 3-degrees-of-freedom audio field may further be caused to perform at least one of: determine a listener position orientation relative to the defined position with the audio field based on the at least one listener position within a 6-degrees-of-freedom or enhanced 3-degrees-of-freedom audio field and the defined position parameter, wherein the apparatus caused to render at least one ambiance audio signal by processing the at least one respective diffuse background audio signal based on the at least one parameter and the listener position and/or orientation within the 6-degrees-of-freedom or enhanced 3-degrees-of-freedom audio field may further be caused to render the ambiance audio signal based on the a listener position orientation relative to the defined position being within the directional range.

According to a seventh aspect there is provided an apparatus comprising defining circuitry configured to define at least one ambience audio representation, the ambience audio representation comprises at least one respective diffuse background audio signal and at least one parameter, the at least one parameter associated with the at least one respective diffuse background audio signal and further associated with at least one frequency range or at least one part of the frequency range, at least onetime period or at least one part of the time period and a directional range for a defined position within an audio field, wherein the at least one ambience component representation is configured to be used in rendering an ambiance audio signal by a 6-degrees-of-freedom or enhanced 3-degrees-of-freedom renderer by processing, based on the at least one ambience audio representation and a listener position and/or direction, the respective diffuse background audio signal.

According to an eighth aspect there is provided an apparatus comprising: obtaining circuitry configured to obtain at least one ambience audio representation, the ambience audio representation comprising at least one respective diffuse background audio signal and at least one parameter, the at least one parameter associated with the at least one respective diffuse background audio signal and further associated with at least one frequency range or at least one part of the frequency range, at least one time period or at least one part of the time period and a directional range for a defined position within an audio field; obtaining circuitry configured to obtain at least one listener position and/or orientation within a 6-degrees-of-freedom or enhanced 3-degrees-of-freedom audio field; rendering circuitry configured to render at least one ambiance audio signal by processing the at least one respective diffuse background audio signal based on the at least one parameter and the listener position and/or orientation within the 6-degrees-of-freedom or enhanced 3-degrees-of-freedom audio field.

According to a ninth aspect there is provided a computer program comprising instructions [or a computer readable medium comprising program instructions] for causing an apparatus to perform at least the following: defining at least one ambience audio representation, the ambience audio representation comprises at least one respective diffuse background audio signal and at least one parameter, the at least one parameter associated with the at least one respective diffuse background audio signal and further associated with at least one frequency range or at least one part of the frequency range, at least onetime period or at least one part of the time period and a directional range for a defined position within an audio field, wherein the at least one ambience component representation is configured to be used in rendering an ambiance audio signal by a 6-degrees-of-freedom or enhanced 3-degrees-of-freedom renderer by processing, based on the at least one ambience audio representation and a listener position and/or direction, the respective diffuse background audio signal.

According to a tenth aspect there is provided a computer program comprising instructions [or a computer readable medium comprising program instructions] for causing an apparatus to perform at least the following: obtaining at least one ambience audio representation, the ambience audio representation comprising at least one respective diffuse background audio signal and at least one parameter, the at least one parameter associated with the at least one respective diffuse background audio signal and further associated with at least one frequency range or at least one part of the frequency range, at least one time period or at least one part of the time period and a directional range for a defined position within an audio field; obtaining at least one listener position and/or orientation within a 6-degrees-of-freedom or enhanced 3-degrees-of-freedom audio field; rendering at least one ambiance audio signal by processing the at least one respective diffuse background audio signal based on the at least one parameter and the listener position and/or orientation within the 6-degrees-of-freedom or enhanced 3-degrees-of-freedom audio field.

According to an eleventh aspect there is provided a non-transitory computer readable medium comprising program instructions for causing an apparatus to perform at least the following: defining at least one ambience audio representation, the ambience audio representation comprises at least one respective diffuse background audio signal and at least one parameter, the at least one parameter associated with the at least one respective diffuse background audio signal and further associated with at least one frequency range or at least one part of the frequency range, at least onetime period or at least one part of the time period and a directional range for a defined position within an audio field, wherein the at least one ambience component representation is configured to be used in rendering an ambiance audio signal by a 6-degrees-of-freedom or enhanced 3-degrees-of-freedom renderer by processing, based on the at least one ambience audio representation and a listener position and/or direction, the respective diffuse background audio signal.

According to a twelfth aspect there is provided a non-transitory computer readable medium comprising program instructions for causing an apparatus to perform at least the following: obtaining at least one ambience audio representation, the ambience audio representation comprising at least one respective diffuse background audio signal and at least one parameter, the at least one parameter associated with the at least one respective diffuse background audio signal and further associated with at least one frequency range or at least one part of the frequency range, at least one time period or at least one part of the time period and a directional range for a defined position within an audio field; obtaining at least one listener position and/or orientation within a 6-degrees-of-freedom or enhanced 3-degrees-of-freedom audio field; rendering at least one ambiance audio signal by processing the at least one respective diffuse background audio signal based on the at least one parameter and the listener position and/or orientation within the 6-degrees-of-freedom or enhanced 3-degrees-of-freedom audio field.

According to a thirteenth aspect there is provided an apparatus comprising: means for defining at least one ambience audio representation, the ambience audio representation comprises at least one respective diffuse background audio signal and at least one parameter, the at least one parameter associated with the at least one respective diffuse background audio signal and further associated with at least one frequency range or at least one part of the frequency range, at least onetime period or at least one part of the time period and a directional range for a defined position within an audio field, wherein the at least one ambience component representation is configured to be used in rendering an ambiance audio signal by a 6-degrees-of-freedom or enhanced 3-degrees-of-freedom renderer by processing, based on the at least one ambience audio representation and a listener position and/or direction, the respective diffuse background audio signal.

According to a fourteenth aspect there is provided an apparatus comprising: means for obtaining at least one ambience audio representation, the ambience audio representation comprising at least one respective diffuse background audio signal and at least one parameter, the at least one parameter associated with the at least one respective diffuse background audio signal and further associated with at least one frequency range or at least one part of the frequency range, at least one time period or at least one part of the time period and a directional range for a defined position within an audio field; means for obtaining at least one listener position and/or orientation within a 6-degrees-of-freedom or enhanced 3-degrees-of-freedom audio field; means for rendering at least one ambiance audio signal by processing the at least one respective diffuse background audio signal based on the at least one parameter and the listener position and/or orientation within the 6-degrees-of-freedom or enhanced 3-degrees-of-freedom audio field.

According to a fifteenth aspect there is provided a computer readable medium comprising program instructions for causing an apparatus to perform at least the following: defining at least one ambience audio representation, the ambience audio representation comprises at least one respective diffuse background audio signal and at least one parameter, the at least one parameter associated with the at least one respective diffuse background audio signal and further associated with at least one frequency range or at least one part of the frequency range, at least onetime period or at least one part of the time period and a directional range for a defined position within an audio field, wherein the at least one ambience component representation is configured to be used in rendering an ambiance audio signal by a 6-degrees-of-freedom or enhanced 3-degrees-of-freedom renderer by processing, based on the at least one ambience audio representation and a listener position and/or direction, the respective diffuse background audio signal.

According to a sixteenth aspect there is provided a computer readable medium comprising program instructions for causing an apparatus to perform at least the following: obtaining at least one ambience audio representation, the ambience audio representation comprising at least one respective diffuse background audio signal and at least one parameter, the at least one parameter associated with the at least one respective diffuse background audio signal and further associated with at least one frequency range or at least one part of the frequency range, at least one time period or at least one part of the time period and a directional range for a defined position within an audio field; obtaining at least one listener position and/or orientation within a 6-degrees-of-freedom or enhanced 3-degrees-of-freedom audio field; rendering at least one ambiance audio signal by processing the at least one respective diffuse background audio signal based on the at least one parameter and the listener position and/or orientation within the 6-degrees-of-freedom or enhanced 3-degrees-of-freedom audio field.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for the provision of efficient representation of audio in immersive systems implementing translation.

Figure 1:
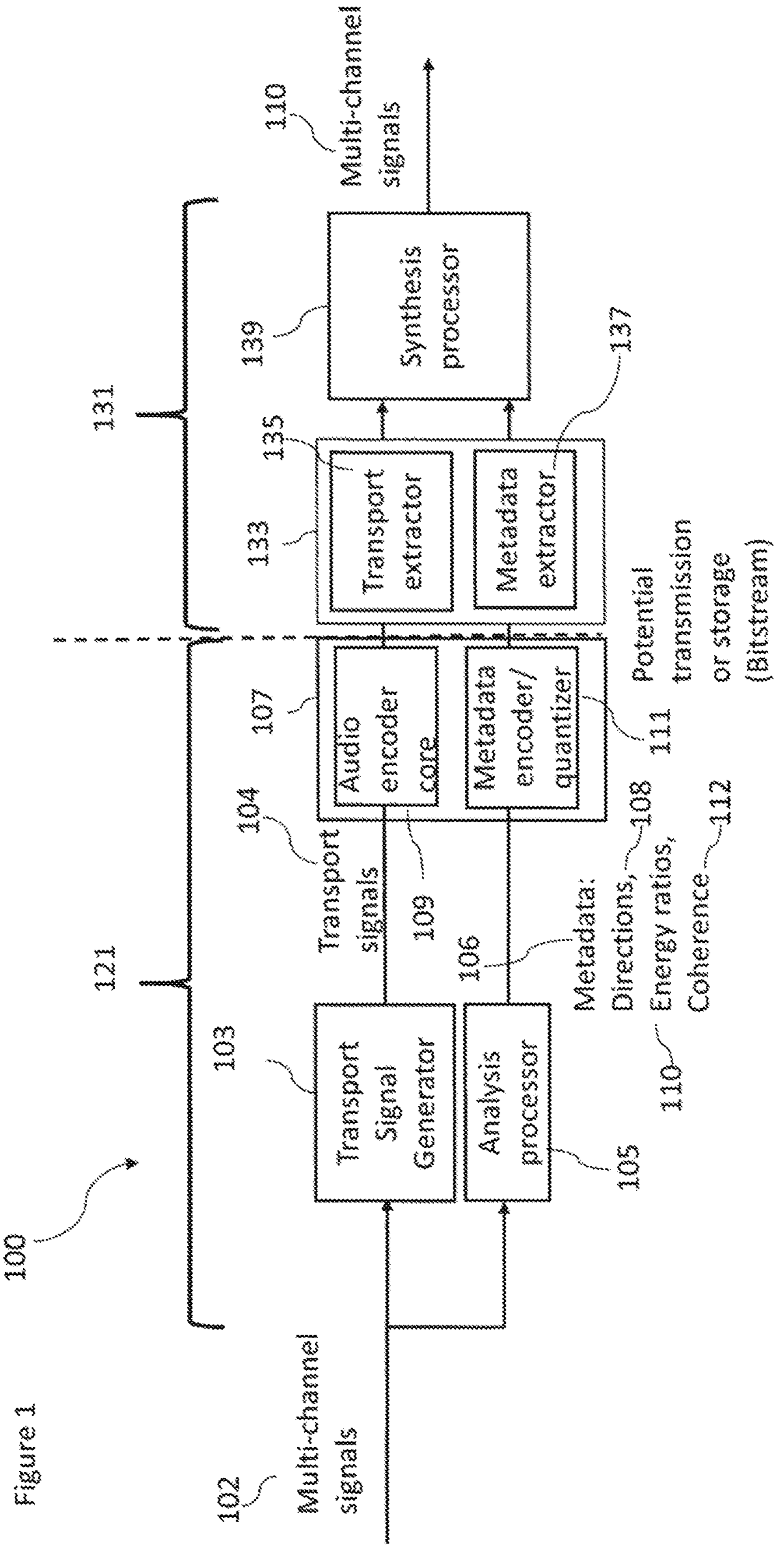
FIG. 1 shows schematically a system of apparatus suitable for implementing some embodiments.

With respect to FIG. 1 an example apparatus and system for implementing audio capture and rendering are shown. The system 100 is shown with an 'analysis' part 121 and a 'synthesis' part 131. The 'analysis' part 121 is the part from receiving the multi-channel loudspeaker signals up to an encoding of the metadata and transport signal and the 'synthesis' part 131 is the part from a decoding of the encoded metadata and transport signal to the presentation of the re-generated signal (for example in multi-channel loudspeaker form).

The input to the system 100 and the 'analysis' part 121 is the multi-channel signals 102. In the following examples a microphone channel signal input is described, however any suitable input (or synthetic multi-channel) format may be implemented in other embodiments. For example in some embodiments the spatial analyser and the spatial analysis may be implemented external to the encoder. For example in some embodiments the spatial metadata associated with the audio signals may be a provided to an encoder as a separate bit-stream. In some embodiments the spatial metadata may be provided as a set of spatial (direction) index values.

The multi-channel signals are passed to a transport signal generator 103 and to an analysis processor 105.

In some embodiments the transport signal generator 103 is configured to receive the multi-channel signals and generate a suitable transport signal comprising a determined number of channels and output the transport signals 104. For example the transport signal generator 103 may be configured to generate a 2 audio channel downmix of the multi-channel signals. The determined number of channels may be any suitable number of channels. The transport signal generator in some embodiments is configured to otherwise select or combine, for example, by beamforming techniques the input audio signals to the determined number of channels and output these as transport signals.

In some embodiments the transport signal generator 103 is optional and the multi-channel signals are passed unprocessed to an encoder 107 in the same manner as the transport signal are in this example.

In some embodiments the analysis processor 105 is also configured to receive the multi-channel signals and analyse the signals to produce metadata 106 associated with the multi-channel signals and thus associated with the transport signals 104. The analysis processor 105 may be configured to generate the metadata which may comprise, for each time-frequency analysis interval, a direction parameter 108 and an energy ratio parameter 110 and a coherence parameter 112 (and in some embodiments a diffuseness parameter). The direction, energy ratio and coherence parameters (and diffuseness parameter) may in some embodiments be considered to be spatial audio parameters. In other words the spatial audio parameters comprise parameters which aim to characterize the sound-field created by the multi-channel signals (or two or more playback audio signals in general).

In some embodiments the parameters generated may differ from frequency band to frequency band. Thus for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The transport signals 104 and the metadata 106 may be passed to an encoder 107.

In some embodiments, the spatial audio parameters may be grouped or separated into directional and non-directional (such as, e.g., diffuse) parameters.

The encoder 107 may comprise an audio encoder core 109 which is configured to receive the transport (for example downmix) signals 104 and generate a suitable encoding of these audio signals. The encoder 107 can in some embodiments be a computer (running suitable software stored on memory and on at least one processor), or alternatively a specific device utilizing, for example, FPGAs or ASICs. The encoding may be implemented using any suitable scheme. The encoder 107 may furthermore comprise a metadata encoder/quantizer 111 which is configured to receive the metadata and output an encoded or compressed form of the information. In some embodiments the encoder 107 may further interleave, multiplex to a single data stream or embed the metadata within encoded downmix signals before transmission or storage shown in FIG. 1 by the dashed line. The multiplexing may be implemented using any suitable scheme.

In the decoder side, the received or retrieved data (stream) may be received by a decoder/demultiplexer 133. The decoder/demultiplexer 133 may demultiplex the encoded streams and pass the audio encoded stream to a transport extractor 135 which is configured to decode the audio signals to obtain the transport signals. Similarly the decoder/demultiplexer 133 may comprise a metadata extractor 137 which is configured to receive the encoded metadata and generate metadata. The decoder/demultiplexer 133 can in some embodiments be a computer (running suitable software stored on memory and on at least one processor), or alternatively a specific device utilizing, for example, FPGAs or ASICs.

The decoded metadata and transport audio signals may be passed to a synthesis processor 139.

The system 100 'synthesis' part 131 further shows a synthesis processor 139 configured to receive the transport and the metadata and re-creates in any suitable format a synthesized spatial audio in the form of multi-channel signals 110 (these may be multichannel loudspeaker format or in some embodiments any suitable output format such as binaural signals for headphone listening or Ambisonics signals, depending on the use case) based on the transport signals and the metadata.

Therefore in summary first the system (analysis part) is configured to receive multi-channel audio signals.

Then the system (analysis part) is configured to generate a suitable transport audio signal (for example by selecting or downmixing some of the audio signal channels).

The system is then configured to encode for storage/transmission the transport signal and the metadata.

After this the system may store/transmit the encoded transport and metadata.

The system may retrieve/receive the encoded transport and metadata.

Then the system is configured to extract the transport and metadata from encoded transport and metadata parameters, for example demultiplex and decode the encoded transport and metadata parameters.

The system (synthesis part) is configured to synthesize an output multi-channel audio signal based on extracted transport audio signals and metadata Object-based 6DoF audio is generally well understood. It works particularly well for many types of produced content. Live capture, or combining live capture and produced content. For example live capture may require more capture-specific approaches, which are generally not at least fully object-based. For example, Ambisonics (FOA/HOA) capture or an immersive capture resulting in a parametric representation may be utilized. These formats can be of value also for representing existing legacy content in a 6DoF environment. Furthermore, mobile-based capture can become increasingly important for user-generated immersive content. Such capture often produces a parametric audio scene representation. In general, thus, object-based audio is not sufficient to cover all use cases, possibilities in capture, and utilization of legacy audio content.

Conventional parametric content capture is based on the traditional 3DoF use case.

Although directional components may be represented by a direction parameter and associated parameters treatment of ambience (diffuse) signals may be dealt with in a different manner and implemented in a manner as shown in the embodiments as described herein. This allows, for example, the use of object-based audio for audio sources and the use of an ambience representation for the ambience signals in rendering for 3DoF and 6 DoF systems.

The embodiments described herein define and represent the ambience aspects of the sound field in such a manner that the translation of the user with respect to the renderer is able to be accounted for allowing for efficient and flexible implementations and content design. Otherwise the ambience signal needs to be reproduced as either several object-based audio streams or, more likely, as a channel-bed or as at least one Ambisonics representation. This will generally increase the number of audio signals and thus bit rate associated with the ambience audio, which is not desirable.

Traditional object-based audio that generally describes point sources (although they can have a size) is ill-suited for providing ambience audio.

A multi-channel bed (e.g., 5.1) limits the adaptability of the ambience to user movement and a similar issue is faced for FOA/HOA. On the other hand, providing the adaptability by, e.g., mixing several such representations based on user location unnecessarily increases the bit rate and potentially also the complexity.

The concept as discussed herein in further detail is the defining and determination of an audio scene audio ambience audio energy representation. The ambience audio energy representation may be used to represent "non-directional" sound.

In the following disclosure this representation is called Ambience Component Representation (ACR) or ambience audio representation. It is particularly suitable for a 6DoF media content, but can be used more generally in 3DoF and 3DoF+ systems and in any suitable spatial audio system.

As shown in further detail herein a ACR parameter may be used to define a sampled position in the virtual environment (for example a 6DoF environment), and can also be combined to render ambience audio at a given position (x, y, z) of a user. The ambience rendering based on ACR can be dependent or independent of rotation.

In some embodiments in order to combine several ACR for the ambience rendering, each ACR can include at least a maximum effective distance but can also include a minimum effective distance. Therefore, each ACR rendering can be defined, e.g., for a range of distances between the ACR position and the user position.

In some embodiments a single ACR can be defined for a position in a 6DoF space, and can be based on a time-frequency metadata describing at least the diffuse energy ratio (which can be expressed as '1—directional energy ratios' or in some cases as '1—(directional energy ratios+remainder energy'), where the remainder energy is not diffuse and not directional, e.g., microphone noise). This directional representation is relevant, because a real-life waveform signal can include directional components also after advanced processing such as acoustic source separation carried out on the capture array signals. Thus, the ACR metadata can in some embodiments include a directional component, although its main purpose is to provide a non-directional diffuse sound.

The ACR parameter (which mainly describes "non-directional sound", as explained above) can in some embodiments include further directional information in the sense that it can have different ambience when "seen/heard" from different angles. By different angle it is meant an angle relative to ACR position (and rotation, at least in case the directional information is provided).

In some embodiments ACR can include more than one time-frequency (TF) metadata set that can relate to at least one of:

Different downmix or transport signals (part of the ACR)

A different combination of downmix or transport signals (part of the ACR)

Rendering position distance relative to ACR

Rendering orientation relative to ACR

Coherence properties of at least one downmix or transport signal

More than one time-frequency (TF) metadata set relating to said signals/aspects can be realized, for example in some embodiments by defining a scene graph with more than one audio source for one ACR.

The ACR can in some embodiments be a self-contained ambience description that adapts its contribution to the overall rendering at the user position (rendering position) in the 6DoF media scene.

Thus considering a whole 6DoF audio environment, the sound can be classified into the non-directional and directional parts. Thus, while ACR is used for the ambience representation, object-based audio can be added for prominent sounds sources (providing "directional sound").

The embodiments as described herein may be implemented in an audio content capture and/or audio content creation/authoring toolbox for 3DoF/6DoF audio, as a parametric input representation (of at least a part of a 3DoF/6DoF audio scene) to an audio codec, as a parametric audio representation (a part of coding model) in an audio encoder and a coded bitstream, as well as in 3DoF/6DoF audio rendering devices and software.

The embodiments therefore cover several parts of the end-to-end system as shown in FIG. 1 individually or in combination.

Figure 2:
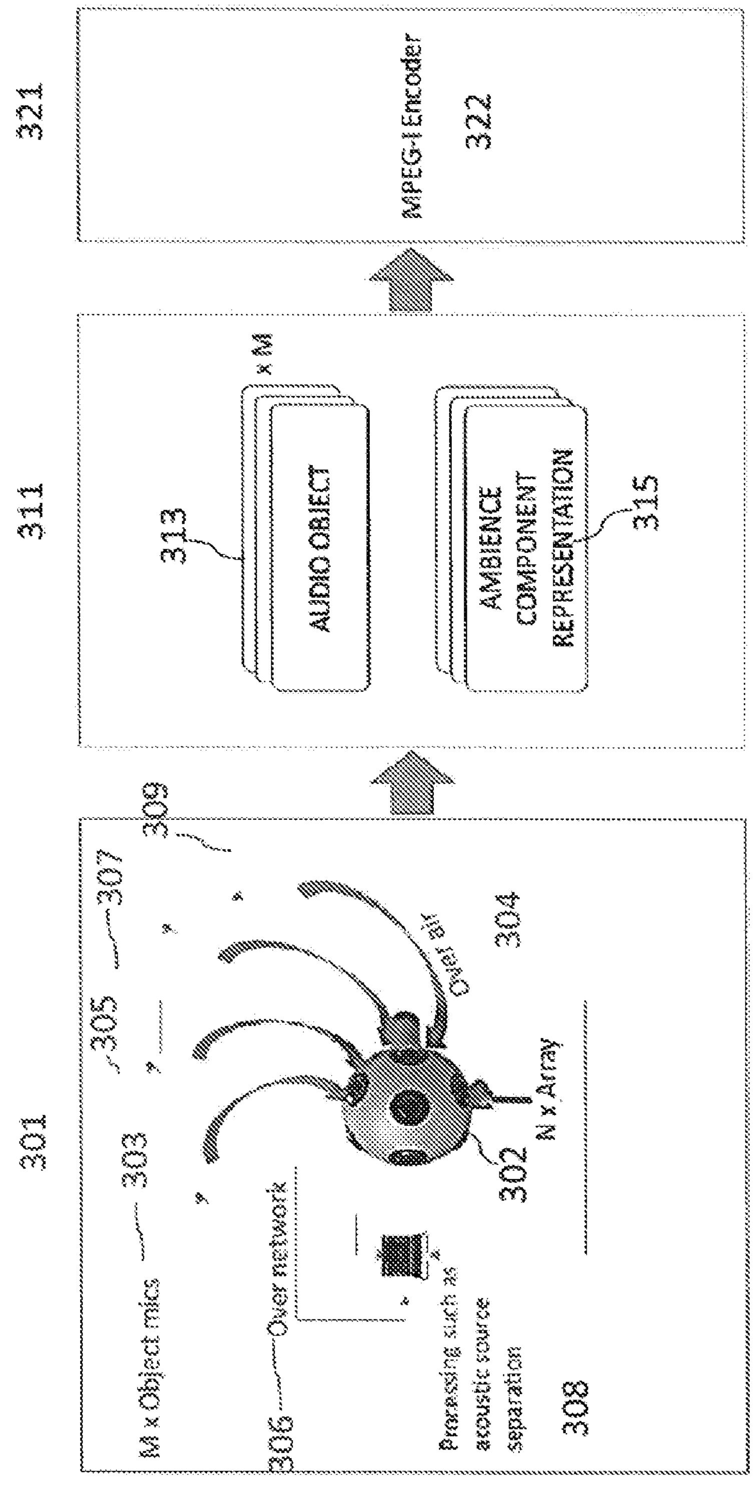
FIG. 2 shows a live capture system for 6 DoF audio suitable for implementing some embodiments.

With respect to FIG. 2 is shown a system view for a suitable live capture apparatus 301 for MPEG-I 6DoF audio. At least one microphone array 302 (in this example implementing also VR cameras) are used to record the scene. In addition, at least one close-up microphone, in this example microphones 303, 305, 307 and 309 (that can be mono, stereo, array microphones) are used to record at least some important sound sources. The sound captured by close-up microphones 303, 305, 307 and 309 may travel over the air 304 to the microphone arrays. In some embodiments the audio signals (streams) from the microphones are transported to a server 308 (for example over a network 306). The server 308 may be configured to perform alignment and other processing (such as, e.g., acoustic source separation). The arrays 302 or the server 308 furthermore perform spatial analysis and output audio representations for the captured 6DoF scene.

In some recording setups, at least one of the close-up microphone signals can be replaced or accompanied by a corresponding signal feed directly from a sound source such as an electric guitar for example.

In this example, the audio representations 311 of the audio scene comprise audio objects 313 (in this example Mx audio objects are represented) and at least one Ambience Component Representation (ACR) 315. The overall 6DoF audio scene representation, consisting of audio objects and ACRs is thus fed to the MPEG-I encoder.

The encoder 322 outputs a standard-compliant bitstream.

In some embodiments the ACR implementation may comprise one (or more) audio channel and associated metadata. In some embodiments the ACR representation may comprise a channel bed and the associated metadata.

In some embodiments the ACR representation is generated in a suitable (MPEG-I) audio encoder. However in some embodiments any suitable format audio encoder may implement the ACR representation.

Figure 3:
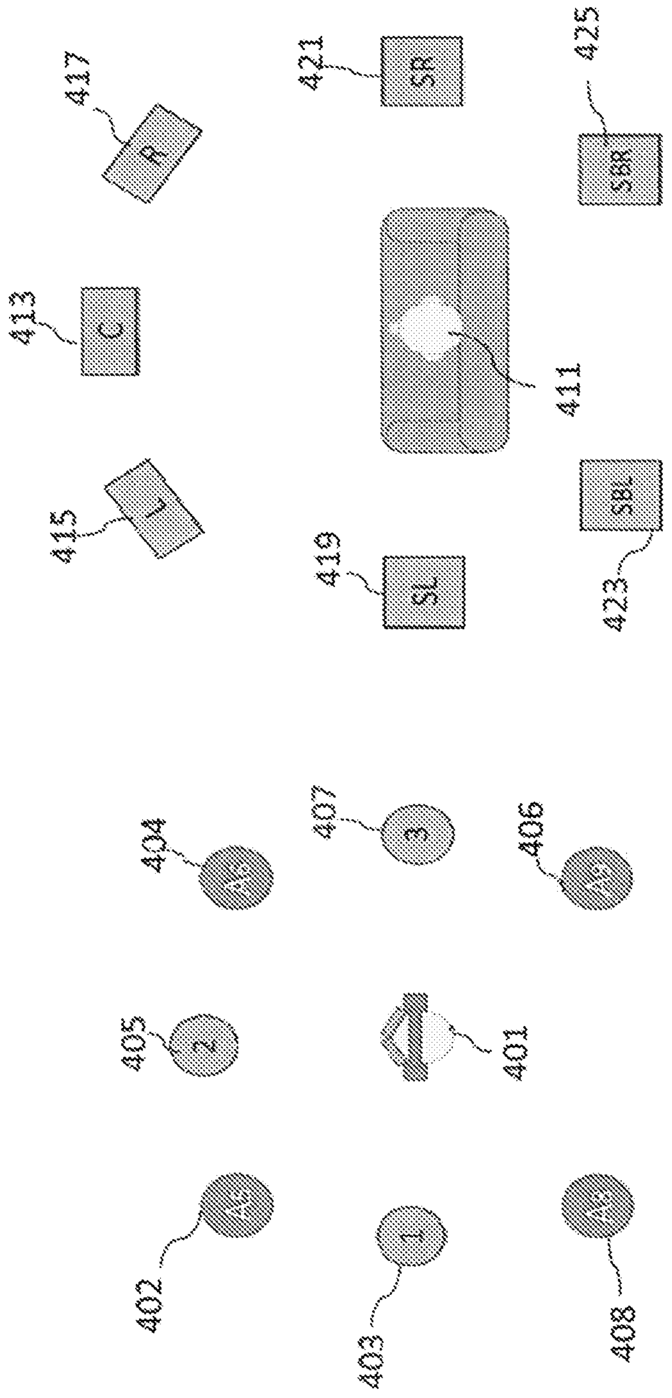
FIG. 3 shows example 6DoF audio content based on audio objects and ambience audio representations.

FIG. 3 illustrates a user in a 3DoF/6DoF audio (or generally media) scene. The left hand side of the Figure shows an example implementation wherein a user 401 experiences a combination of object-based audio (denoted here as audio objects 1 403 located to the left of the user 401, audio object 2 405 located forward of the user 401, and audio object 3 407 located to the right of the user 401) and ambience-component audio (denoted here as $A_N$, where N=5, 6, 8, 9 and shown in FIGS. 3 as $A_5$ 402, $A_6$ 404, $A_8$ 408 and $A_9$ 406).

FIG. 3 furthermore shows a parallel traditional channel-based home-theatre audio such as a 7.1 loudspeaker configuration (or a 7.0 as shown on the right hand side of FIG. 3, as the LFE channel or subwoofer is not illustrated). As such FIG. 3 shows a user 411 and centre channel 413, left channel 415, right channel 417, surround left channel 419, surround right channel 421, surround back left channel 423 and surround back right channel 425.

While the role of the object-based audio is the same as in other 6DoF models, the illustration of FIG. 3 describes an example role of the ambience components or ambience audio representations. As the user moves in the 6DoF scene, the goal of the ambience component representation (ACR) is to create the position- and time-varying ambience as a "virtual loudspeaker setup" that is dependent on the user position. In other words, from the viewpoint of the listening experience, the ambience (created by combining the ambience components) should always appear around the user at some non-specific distance. According to this model, the user thus need not enter the immediate vicinity of or indeed the exact position of the "scene based audio (SBA) points" in the scene to hear them. Thus in the embodiments as described herein, the ambience can be constructed from the ACR points that surround the user (and in some embodiments switching on and off ACR points based on the distance between the ACR location and user being greater than or less than a determined threshold respectively). Similarly in some embodiments as described herein ambience components may be combined based on a suitable weighting according to user movement.

Thus in some embodiments the ambience component of the audio output may therefore be created as a combination of active ACRs.

In some embodiments the renderer is therefore configured to obtain information (for example receive or detect or determine) which ACRs are active and are currently contributing to the ambience rendering at current user position (and rotation).

In some embodiments the renderer may determine at least one closest ACR to the user position. In some further embodiments the renderer may determine at least one closest ACR not overlapping with the user position. This search may be, e.g., a minimum number of closest ACR or for a best sectorial match with the user position for a fixed number of ACR or any other suitable search.

In some embodiments the ambience component representation can be non-directional. However in some other embodiments the ambience component representation can be directional.

Figure 4:
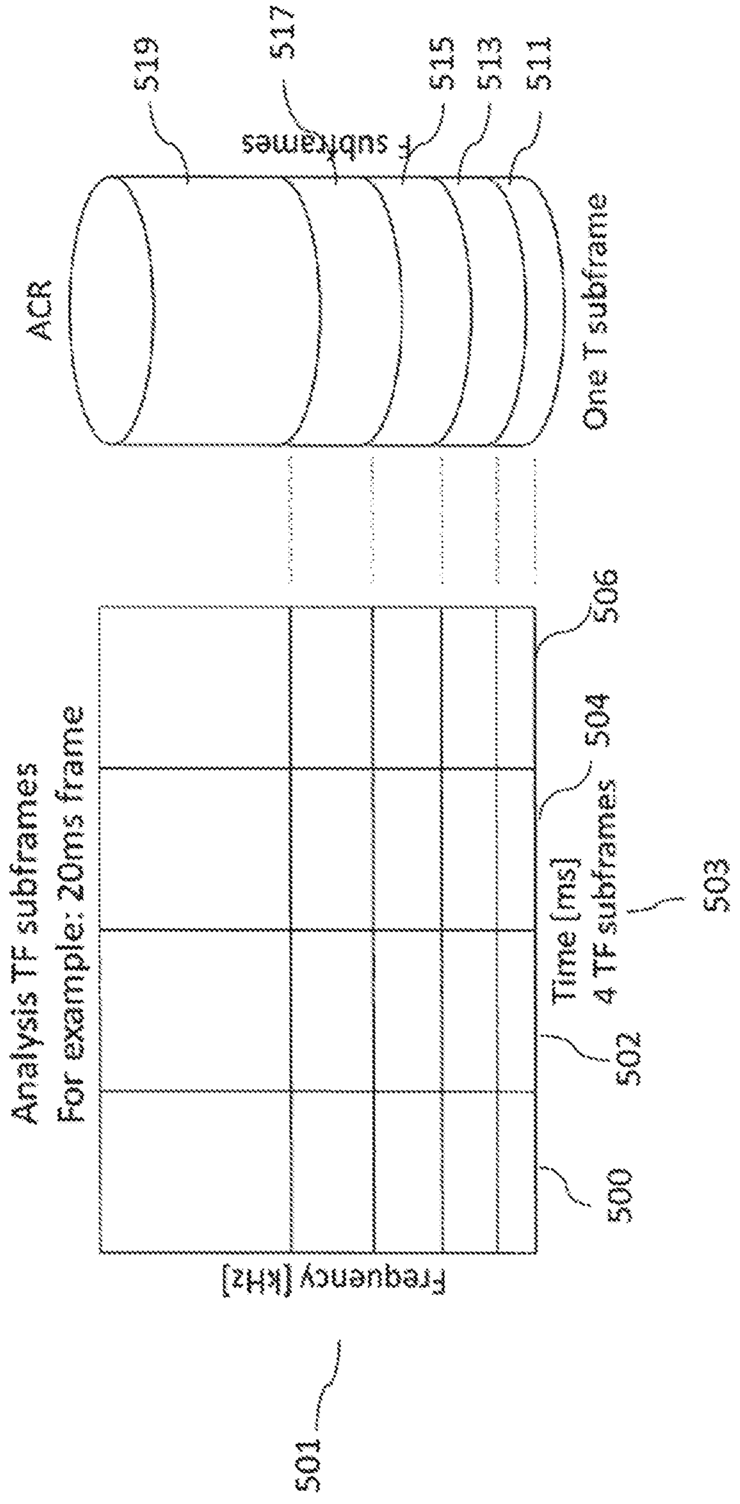
FIG. 4 shows schematically ambience component representation (ACR) over time and frequency sub-frames according to some embodiments.

With respect to FIG. 4 an example ambience component representation is shown.

Parametric spatial analysis (for example spatial audio coding, SPAC, or metadata assisted spatial audio, MASA, for general multi-microphone capture including mobiles, Directional audio coding, DirAC, for first order ambisonics, FOA, capture) typically consider the audio scene (typically sampled at a single position) as a combination of directional components and non-directional or diffuse sound.

A parametric spatial analysis can be performed according to a suitable time-frequency (TF) representation. In the example case of FIG. 4, the audio scene (practical mobile-device) capture is based on a 20-ms frame 503, where the frame is divided into 4 time-sub-frames of 5 ms each 500, 502, 504 and 506. Furthermore, the frequency range 501 is divided into 5 subbands 511, 513, 515, 517, and 519 as shown by the T sub-frame 510. Thus, each 20-ms TF update interval may provide 20 TF sub-frames or tiles (4×5=20). In some embodiments any other suitable TF resolution may be used. For example, a practical implementation may utilize 24 or even 32 subbands for a total of 96 (4×24=96) or 128 (4×32=128) TF sub-frames or tiles, respectively. On the other hand, the time resolution may in some cases be lower thus reducing the number of TF sub-frames or tiles accordingly.

Figure 5:
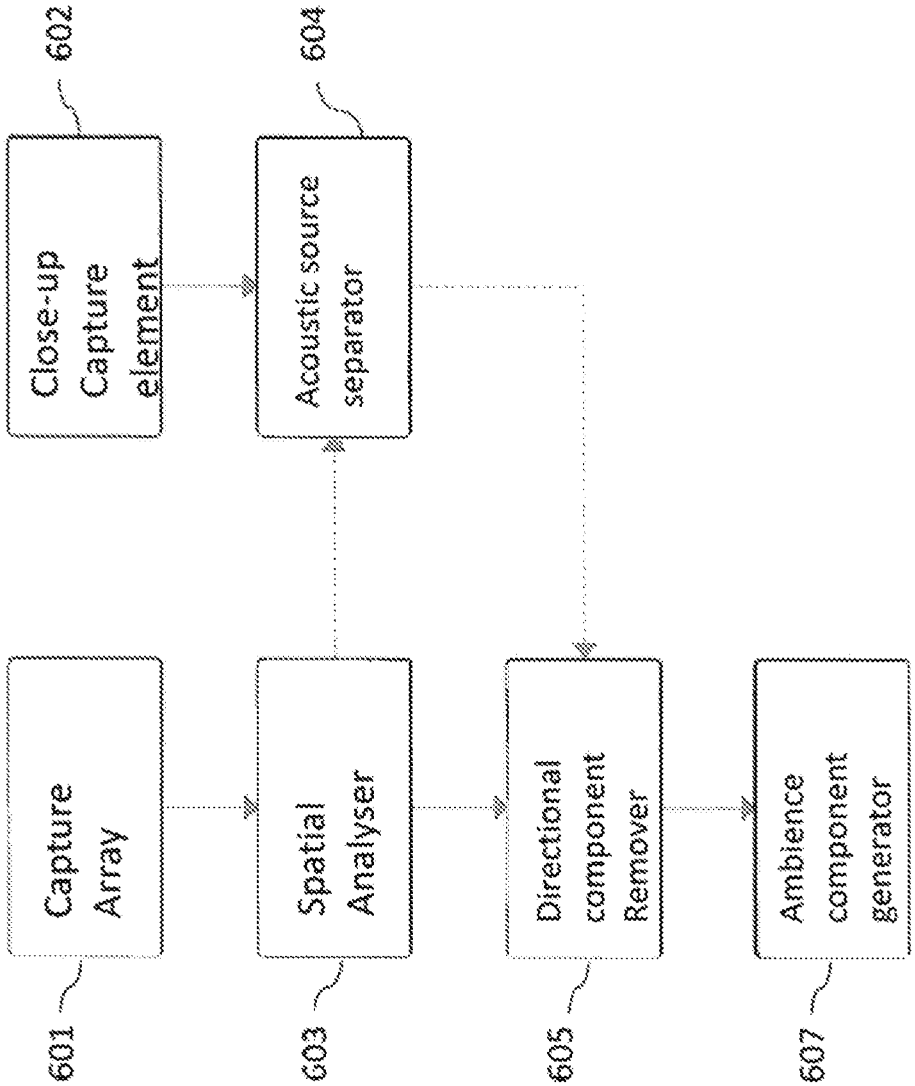
FIG. 5 shows schematically an ambience component representation (ACR) determiner according to some embodiments.

FIG. 5 shows an example ACR determiner according to some embodiments. In this example the ACR determiner is configured with a microphone array (or capture array) 601 configured to capture audio on which spatial analysis can be performed. However in some embodiments the ACR determiner is configured to receive or obtain the audio signals otherwise (for example receive via a suitable network or wireless communications system). Furthermore although the ACR determiner in this example is configured to obtain multichannel audio signals via a microphone array in some embodiments the obtained audio signals are in any suitable format, for example ambisonics (First order and/or higher order ambisonics) or some other captured or synthesised audio format. In some embodiments the system as shown in FIG. 1 may be employed to capture the audio signals.

The ACR determiner furthermore comprises a spatial analyser 603. The spatial analyser 603 is configured to receive the audio signals and determine parameters such as at least a direction and directional and non-directional energy parameters for each time-frequency (TF) sub-frame or tile. The output of the spatial analyser 603 in some embodiments is passed to a directional component remover 605 and acoustic source separator 604.

In some embodiments the ACR determiner further comprises a close-up capture element 602 configured to capture close sources (for example the instrument player or speaker within the audio scene). The audio signals from the close-up capture element 602 may be passed to an acoustic source separator 604.

The ACR determiner in some embodiments comprises an acoustic source separator 604. The acoustic source separator 604 is configured to receive the output from the close-up capture element 602 and spatial analyser 603 and identify the directional components (close up components) from the results of the analysis. These can then be passed to a directional component remover 605.

The ACR determiner in some embodiments comprises a directional component remover 605 configured to remove the directional components, such as determined by the acoustic source separator 604 from the output of the spatial analyser 603. In such a manner it is possible to remove the directional component, and the non-directional component can be used as the ambience signal.

The ACR determiner may thus in some embodiments comprise an ambience component generator 607 configured to receive the output of the directional component remover 605 and generate a suitable ambience component representation. In some embodiments this may be in the form of a non-directional ACR comprising a downmix of the array audio capture and a time-frequency parametric description of energy (or how much of the energy is ambience—for example an energy ratio value). The generation may in some embodiments be implemented according to any suitable method. For example by applying Immersive voice and audio services (IVAS) metadata assisted spatial audio (MASA) synthesis of the non-directional energy. In such embodiments the directional part (energy) is skipped. Furthermore in some embodiments when creating content or generating a synthetic ambiance representation (and compared to the capturing ambience content as described herein), the ambience energy can be all of the ambience component representation signal. In other words the ambience energy value can be always 1.0 in the synthetically generated version.

Figure 6:
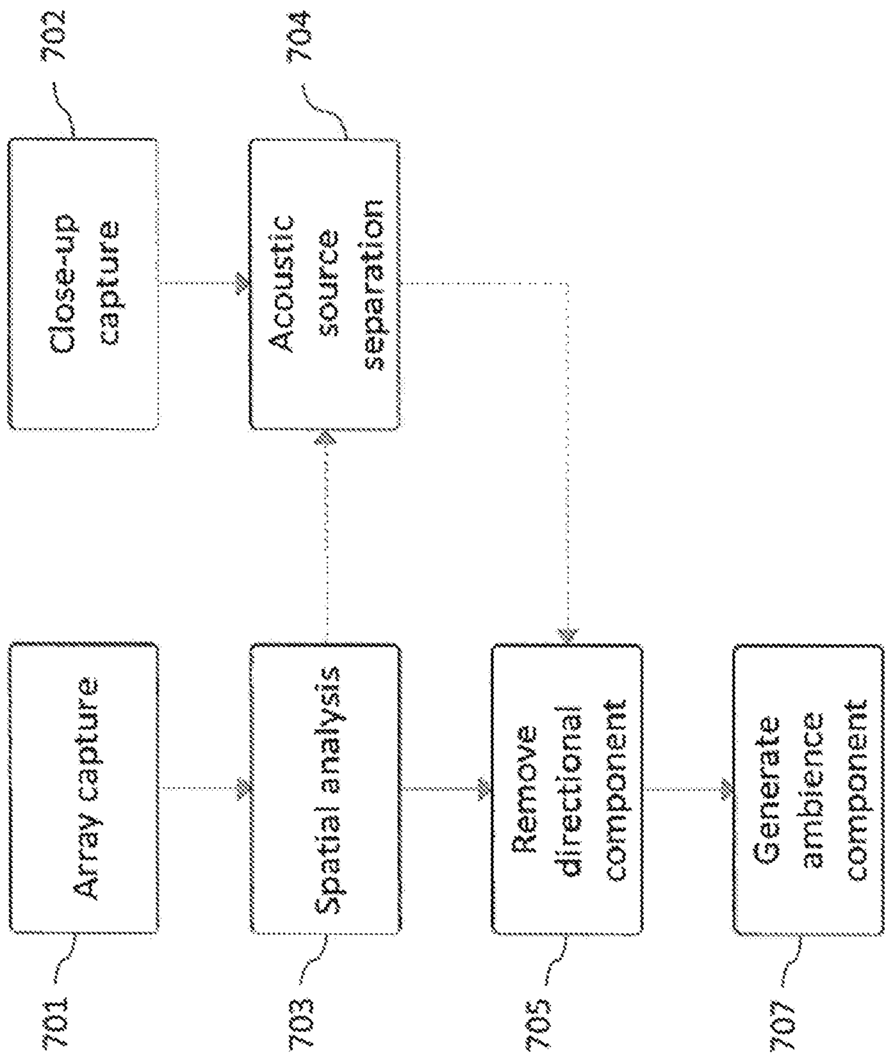
FIG. 6 shows a flow diagram of the operation of the ambience component representation (ACR) determiner according to some embodiments.

With respect to FIG. 6 is shown an example operation of the ACR determiner as shown in FIG. 5 according to some embodiments.

The method thus in some embodiments comprises obtaining the audio scene (for example by using the capture array) as shown in FIG. 6 by step 701.

Furthermore the close-up (or directional) components of the audio scene are obtained (for example by use of the close-up capture microphones) as shown in FIG. 6 by step 701.

Having obtained the audio scene the audio signals from audio capture means or otherwise, the audio signals are then spatially analysed to generate suitable parameters as shown in FIG. 6 by step 703.

Furthermore having obtained the close-up components of the audio scene then these signals are processed along with the audio scene audio signals to perform acoustic source separation as shown in FIG. 6 by step 704.

Having determined the acoustic sources these may then be applied to the audio scene audio signals to remove directional components as shown in FIG. 6 by step 705.

Also having removed directional components the method may then generate the ambience audio representations as shown in FIG. 6 by step 707.

In some embodiments the ACR determiner may be configured to determine or generate a directional ambience component representation. In such embodiments the ACR determiner is configured to generate ACR parameters which include additional directional information associated with the ambience part. The directional information in some embodiments may relate to sectors which can be fixed for a given ACR or variable in each TF sub-frame. In some embodiments the number of sectors, width of each sector, a gain or energy ratio corresponding to each sector can thus vary for each TF sub-frame. Furthermore in some embodiments a frame is covered by a single sub-frame, in other words the frame comprises one or more sub-frames. In some embodiments the frame is a time period and which in some embodiments may be divided into parts of which the ACR can be associated with the time period or at least one part of the time period.

Figure 7:
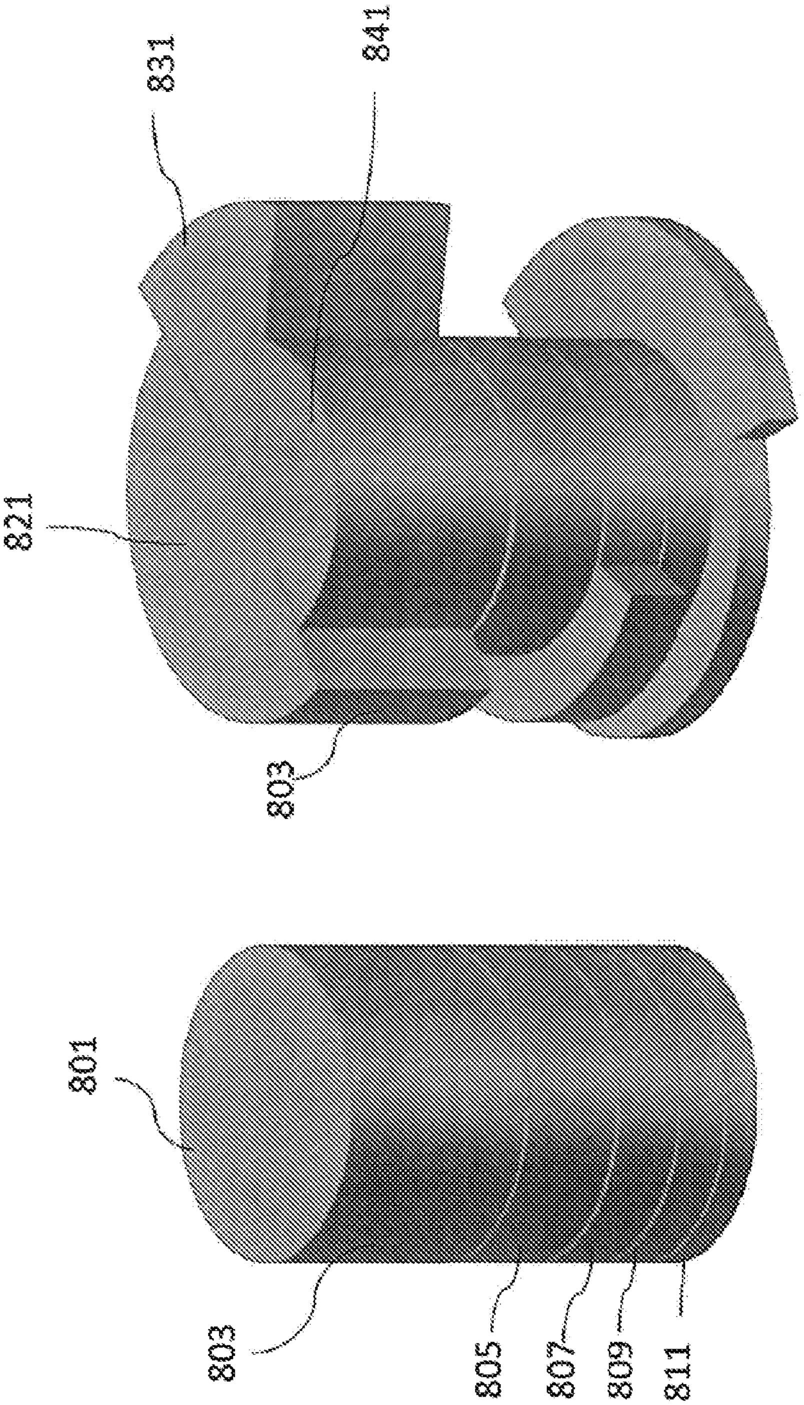
FIG. 7 shows schematically non-directional and directional ambience component representation (ACR) illustrations.

With respect to FIG. 7 is shown an example of non-directional ACR and directional ACR. The left-hand side of FIG. 7 shows a non-directional ACR 801 time sub-frame example. The non-directional ACR sub-frame example 801 comprises 5 frequency sub-band (or sub-frames) 803, 805, 807, 809, and 811 each with associated audio and parameters. It is understood that in some embodiments the number of frequency sub-bands can be time-varying. Furthermore in some embodiments the whole frequency range is covered by a single sub-band, in other words the frequency range comprises one or more sub-bands. In some embodiments the frequency range or band may be divided into parts of which the ACR can be associated with the frequency range (frequency band) or at least one part of the frequency range.

On the right-hand side of FIG. 7 is shown a directional ACR time sub-frame example 821. The directional ACR time sub-frame example 821 comprises 5 frequency sub-bands (or sub-frames) in a manner similar to the non-directional ACR. Each of the frequency sub-frames furthermore comprises one or more sectors. Thus for example a frequency sub-band 803 may be represented three sectors 821, 831 and 841. Each of these sectors may furthermore be represented by associated audio and parameters. The parameters relating to the sectors are typically time-varying. It is furthermore understood that in some embodiments the number of frequency sub-bands can also be time-varying.

It is noted that the non-directional ACR can be considered a special case of the directional ACR, where only one sector (with 360-degree width and a single energy ratio) is used. In some embodiments, an ACR can thus switch between being non-directional and directional based on the time-varying parameter values.

In some embodiments the directional information describes the energy of each TF tile as experienced from a specific direction relative to the ACR. For example when experienced by rotating the ACR or by a user traversing around the ACR.

Thus for example when a directional ACR is used for describing the 6DoF scene ambience, a time-and-position varying ambience signal based on the user position is able to be generated as a contributing ambience component. In this respect the time variation may be one of a change of sector or effective distance range. In some embodiments this is considered in terms of direction, not distance. Effectively, the diffuse scene energy in some embodiments may be assumed not to depend on a distance related to an (arbitrary) object-like point in the scene.

Figure 8:
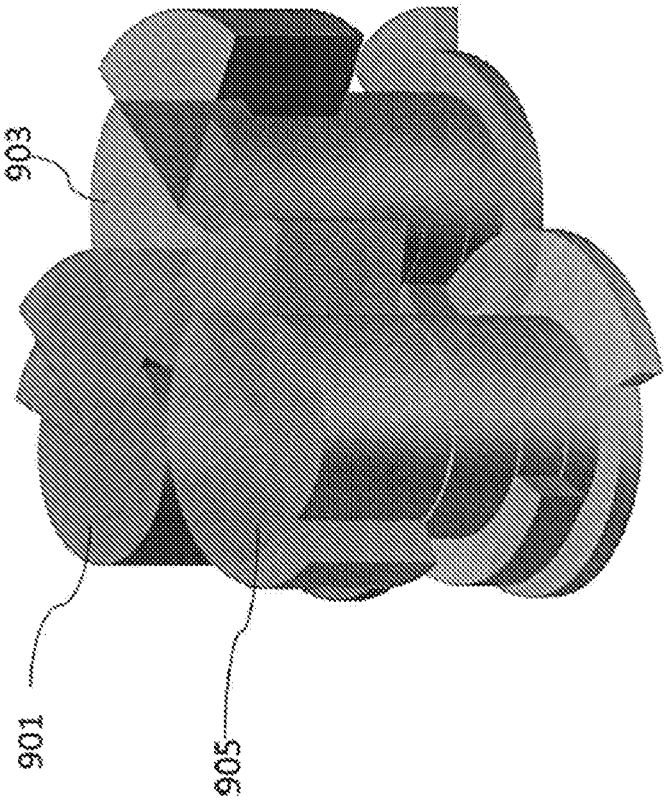
FIG. 8 shows schematically multiple channel directional ambience component representation (ACR) illustrations.

With respect to FIG. 8 a multiple channel directional ACR example is shown. The directional ACR comprise three TF metadata descriptions 901, 903 and 905. The two or more TF metadata descriptions may relate for example to at least one of:

- Different downmix signals (part of the ACR)
- A different combination of downmix signals (part of the ACR)
- Rendering position distance relative to ACR
- Rendering orientation relative to ACR
- Coherence properties of at least one downmix signal In particular, the multi-channel ACR and the effect of the rendering distance between the user and the ACR 'location' is discussed herein in further detail.

When directional information is considered, it can be particularly useful to utilize a multi-channel representation. Any number of channels can be used and can provide additional advantage per additional channel. In FIG. 8, for example, the three TF metadata 901, 903, and 905 all cover all directions. There is one possibility where the direction relative to the ACR position can, for example, result in a different combination of the channels (according to the TF metadata).

In some other embodiments, the direction relative to ACR can select which (at least one) of the (at least two) channels is/are used. In such embodiments a separate metadata is generally used or, alternatively, the selection may be at least partly based on a sector metadata relating to each channel. However, in some embodiments, the channel selection (or combination) could be, e.g., M "loudest sectors" out of the N channels (where M≤N and where "loudest" is defined as the highest sector-wise energy ratio or highest sector-wise energy combining the signal energy and the energy ratio).

In some embodiments there may be a threshold or range for rendering distance defined in the ACR metadata description. For example there may be an ACR minimum or maximum distance or, alternatively, a range of distances where the ACR is considered for rendering, or otherwise 'active' or on (and similarly where the ACR is not considered for rendering, or otherwise 'inactive' or off).

In some embodiments, this distance information can be direction-specific and can refer to at least one channel. Thus, the ACR can in some embodiments be a self-contained ambience description that adapts its contribution to the overall rendering at the user position (rendering position) in the 6DoF media scene.

In some embodiments, at least one of the ACR channels and its associated metadata can define an embedded audio object that is part of the ACR and provides directional rendering. Such an embedded audio object may be employed with a flag such that the renderer is able to apply a 'correct' rendering (rendered as a sound source instead of as diffuse sound). In some embodiments the flag is further used to signal that the embedded audio object supports only a subset of audio-object properties. For example, it may not be generally desirable to allow for the ambience component representation to move in the scene. Though in some embodiments this can be implemented. This would thus generally make the embedded audio object position 'static' and for example preclude at least some forms of user interaction with said audio object or audio source.

Figure 9:
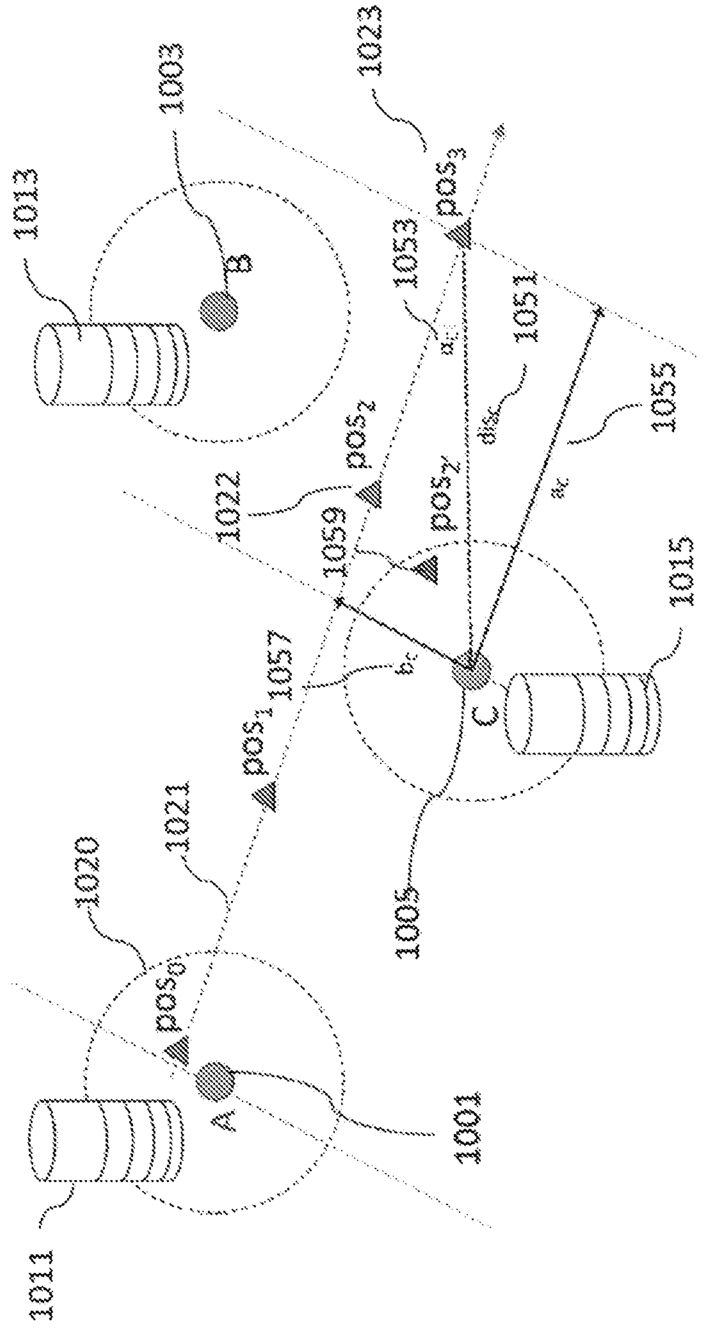
FIG. 9 shows schematically ambience component representation (ACR) combinations at 6DoF rendering positions.

With respect to FIG. 9 is shown an example user (denoted as position $pos_n$) at different rendering positions in a 6DoF scene. For example the user may initially be at location $pos_0$ 1020 and then move through the audio scene along the line passing location $pos_1$ 1021, $pos_2$ 1022, and ending at $pos_3$ 1023. In this example the ambience audio in the 6DoF scene is provided using three ACR. A first ACR 1011 at location A 1001, a second ACR 1013 at location B 1003, and a third ACR 1015 at location C 1005.

In this example for all the defined ACR in the scene, there is a defined 'minimum effective distance' within which the ACR is not used during rendering. Similarly in some embodiments there could be in addition or alternatively a maximum effective distance outside of which the ACR is not used during rendering.

For example, if the minimum effective distance is zero, a user could be located within the audio scene at a position directly over the ACR and the ACR will contribute to the ambience rendering.

The renderer in some embodiments is configured to determine a combination of the ambience component representations that will form the overall rendered ambience signal at each user position based on the constellation of (the relative positions of the ACR to the user) and distance to the surrounding ACR.

In some embodiments the determination can comprise two parts.

In a first part, the renderer is configured to determine which ACR contributes to the current rendering. This for example may be a selection of the 'closest' ACR relative to the user, or based on whether the ACR is within a defined active range or otherwise.

In a second part, the renderer is configured to combine the contributions. In some embodiments the combination can be based on the absolute distances. For example where there are two ACRs located with equal distances then the contribution is split equally. In some embodiments, the renderer is configured to further consider 'directional' distances in determining the contribution to the ambience audio signal. In other words the rendering point in some embodiments appears as a "centre of gravity". However, as the ambience audio energy is diffuse or non-directional (despite the ACR potentially being directional), this is an optional aspect.

Obtaining a smoothly/realistically evolving total ambience signal as a function of the rendering position in the 6DoF content environment may be achieved in the renderer by smoothing any transition between an active and inactive ACR over a minimum or maximum effective distance. For example, in some embodiments a renderer may gradually reduce the contribution of an ACR as a user gets closer to the ACR minimum effective distance. Thus, such an ACR will smoothly cease to contribute as it reaches the minimum relative distance.

For example, in the scene of FIG. 9, a renderer attempting to render an audio signals where the user is located at position $pos_0$ 1020 may render an ambience audio signals where only ambience contributions from ACR B 1013 and ACR C 1015 are used can be considered. This is due to rendering position $pos_0$ being inside the minimum effective distance threshold for ACR A 1001.

Furthermore a renderer attempting to render an audio signals where the user is located at position $pos_1$ 1021 may be configured to render ambience audio signals based on all three ACRs. Furthermore the renderer may be configured to determine the contributions based on their relative distances to the rendering position.

This may also apply to a renderer attempting to render an audio signals where the user is located at position $pos_2$ 1022 (where ambience audio signals are based on all three ACRs).

However, the renderer may be configured to render ambience audio signals when the user is at position $pos_3$ 1023 based on only ACR B 1013 and ACR C 1015 and ignore ambience contribution from ACR A as ACR A located at A 1001 is relatively far away from $pos_3$ 1023 and ACR B and ACR C be considered to dominate in ACR A's main direction. In other words the renderer may be configured to determine that the relative contribution by ACR A may be under a threshold. In other embodiments, the renderer may be configured to consider the contribution provided by ACR A even at $pos_3$ 1023. For example when $pos_3$ is close to at least ACR B's minimum effective distance.

It is noted that the exact selection algorithm based on ACR position metadata can be different in various implementations. Furthermore in some embodiments the renderer determination may be based on a type of ACR.

In some embodiments the renderer may be configured to determine a direction relative to a rendering position movement and the perpendicular direction, $a_x$ and $b_x$, respectively, we have for x=A, B, C:

$a_x = dis_x \cos a_x$ and $b_x = dis_x \sin a_x$.

and determine a contribution based on these factors. In such embodiments the ACR may be provided with two dimensions, however it is possible to consider the ambience components also in three dimensions.

In some embodiments the renderer is configured to consider the relative contributions, for example, such that the directional components ($a_x$ and $b_x$) are considered or such that the absolute distance only is considered. In some embodiments where there are provided directional ACR, the directional components are considered.

In some embodiments the renderer is configured to determine the relative importance of an ACR based on the inverse of the absolute distance or the directional distance component (where for example the ACR is within a maximum effective distance). In some embodiments as described above a smooth buffer or filtering about the minimum effective distance (and similarly, maximum effective distance) may be employed by the renderer. For example, a buffer distance may defined as being two times the minimum effective distance within which the relative importance of the ACR is scaled relative to the buffer zone distance.

As previously discussed, ACR can include more than one TF metadata set. Each set can relate, e.g., to a different downmix signal or set of downmix signals (belonging to said ACR) or a different combination of them.

Figure 10:
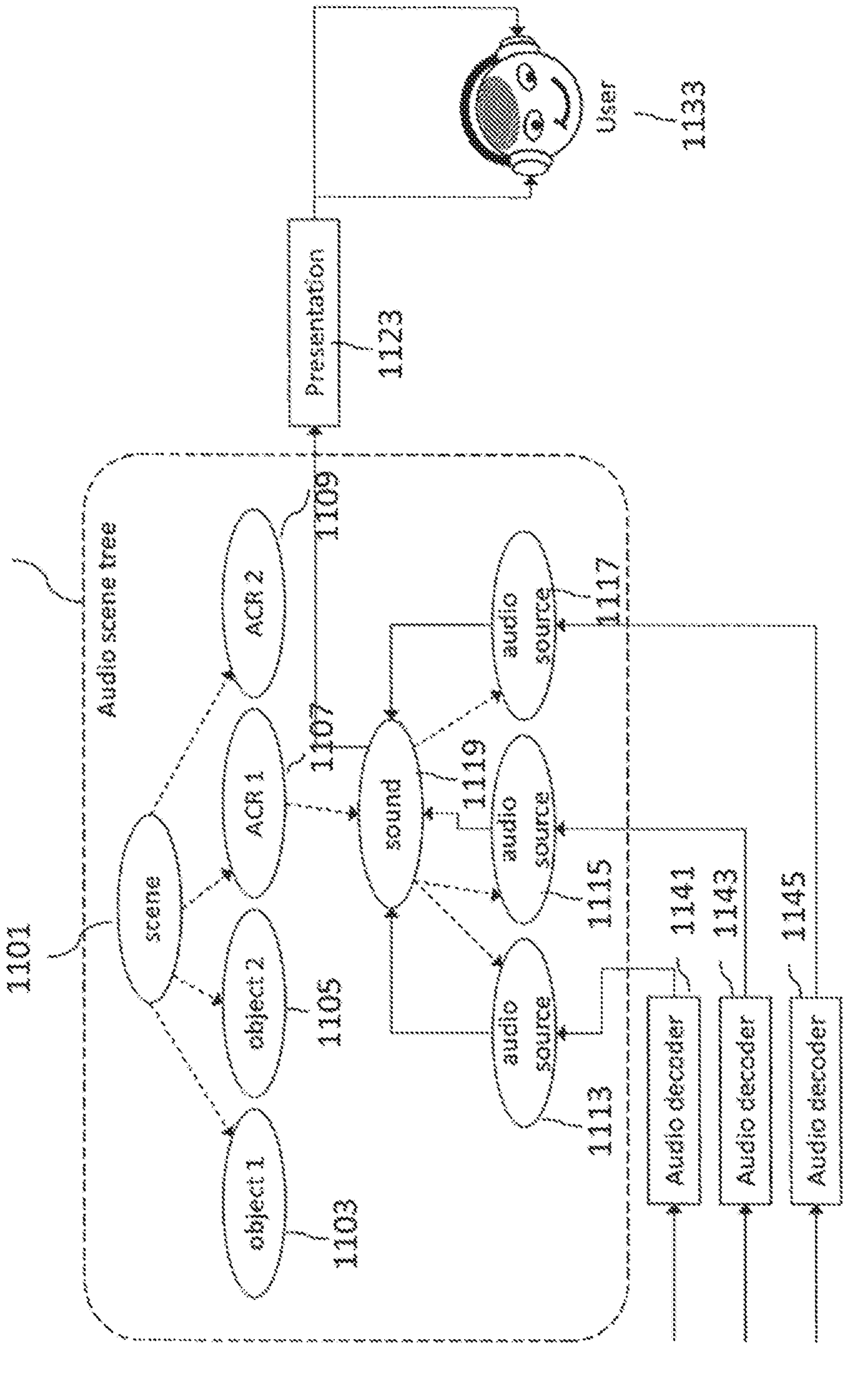
FIG. 10 shows schematically a modelling of ambience component representation (ACR) combinations which can be applied to a renderer according to some embodiments.

With respect to FIG. 10 is shown an example implementation of some embodiments as a practical 6DoF implementation defining a scene graph with more than one audio source for one ACR.

In the example shown in FIG. 10, a modelling of a combination of the ACRs and other audio objects (suitable for implementation within a renderer) is shown. The modelling of the combination is shown in the form of an audio scene tree 1110. The audio scene tree 1110 is shown for an example audio scene 1101. The audio scene 1101 is shown comprising two audio objects, a first audio object 1103 (which may for example be a person) and a second audio object 1105 (which may for example be a car). The audio scene may furthermore comprise two ambience component representations, a first ACR, ACR 1, 1107 (for example ambience representation inside a garage) and a second ACR, ACR 2, 1109 (for example ambience representation outside the garage).

This is of course an example audio scene, and any suitable number of objects and ACRs could be used.

In this example, the ACR 1 1107 comprises three audio sources (signals) that contribute to the rendering of said ambience component (where it is understood that these audio sources do not correspond to directional audio components and are not, for example point sources. These are sources in sense of audio inputs or signals that provide at least part of the overall sound (signal) 1119). For example ACR 1 1107 may comprise a first audio source 1113, a second audio source 1115, and a third audio source 1117. Thus, as shown in FIG. 10 there may be three audio signals received at the three decoder instances, audio decoder instance 1 1141 which provides the first audio source 1113, audio decoder instance 2 1143 which provides the second audio source 1115 and audio decoder instance 3 1145 which provides the third audio source 1117. The ACR sound 1119, which is formed from the audio sources 1113, 1115, and 1117, is passed to the rendering presenter 1123 which outputs to the user 1133. This ACR sound 1119 in some embodiments can be formed based on the user position relative to ACR 1 1107 position. Furthermore based on the user position it may be determined whether ACR 1 1107 or ACR 2 1109 contribute to the ambience and their relative contributions.

Figure 11:
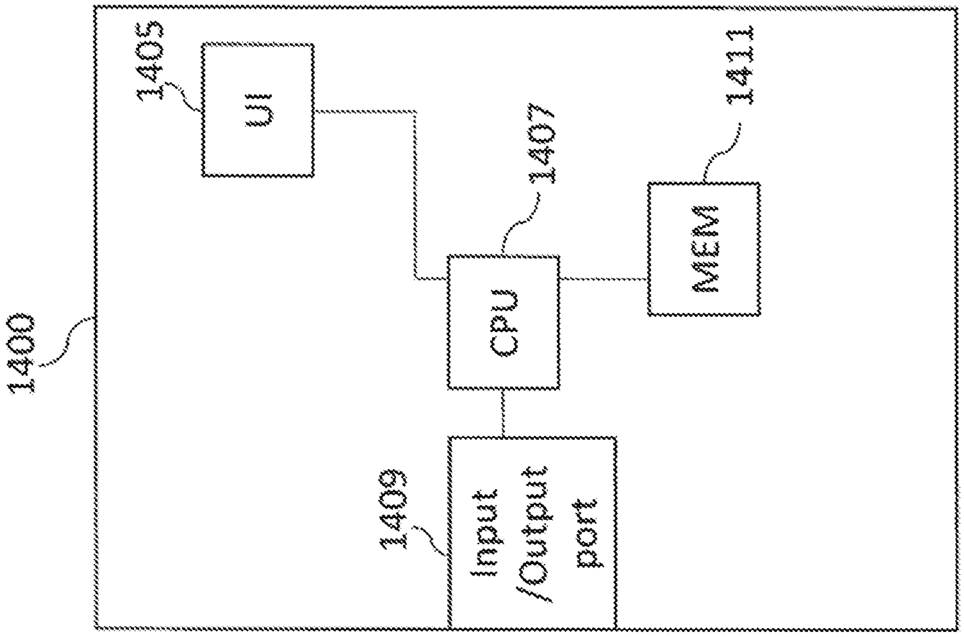
FIG. 11 shows an example device suitable for implementing the apparatus shown.

With respect to FIG. 11 an example electronic device which may be used as the analysis or synthesis device is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein, and generate a suitable audio signal format output by using the processor 1407 executing suitable code. The input/output port 1409 may be coupled to any suitable audio output for example to a multichannel speaker system and/or headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising
at least one processor and
at least one non-transitory memory including a computer program code,
the at least one memory and the computer program code configured to, with the at least one processor, cause the apparatus at least to:
obtain at least two audio signals captured with a microphone array;
analyze the at least two audio signals to determine at least one energy parameter;
obtain at least one close audio signal associated with an audio source;
remove directional audio components associated with the at least one close audio signal from the at least one energy parameter to generate at least one parameter; and
define at least one ambience component representation, the ambience component representation comprising at least one respective diffuse background audio signal and the at least one parameter, the at least one parameter being associated with
the at least one respective diffuse background audio signal,
at least one frequency range or at least one part of the at least one frequency range,
at least one time period or at least one part of the at least one time period, and
a directional range for a defined position within an audio field,
wherein the at least one ambience component representation is configured to be used in rendering an ambiance audio signal, based on
the at least one parameter of the at least one ambience component representation,
the at least one respective diffuse background audio signal, and
at least one of: a rendering position, or a rendering direction relative to the defined position.

2. The apparatus as claimed in claim 1, wherein the directional range defines a range of angles.

3. The apparatus as claimed in claim 1, wherein the at least one ambience component representation further comprises at least one of:
a minimum distance threshold, over which the at least one ambience component representation is configured to be used in rendering the ambiance audio signal;
a maximum distance threshold, under which the at least one ambience component representation is configured to be used in rendering the ambiance audio signal; or
a distance weighting function, to be used in rendering the ambiance audio signal with a 6-degrees-of-freedom or an enhanced 3-degrees-of-freedom renderer, based on the at least one parameter of the at least one ambience component representation, the at least one of: the rendering position, or the rendering direction, and the at least one respective diffuse background audio signal.

4. The apparatus as claimed in claim 1, wherein the at least one memory and the computer program code are configured to, with the at least one processor, cause the apparatus at least to:
generate the at least one respective diffuse background audio signal of the ambience component representation based on the at least two audio signals captured with the microphone array and the at least one close audio signal.

5. The apparatus as claimed in claim 4, wherein generating the at least one respective diffuse background audio signal comprises the at least one memory and the computer program code configured to, with the at least one processor, cause the apparatus to at least one of:

downmix the at least two audio signals captured with the microphone array;

select at least one audio signal from the at least two audio signals captured with the microphone array; or beamform the at least two audio signals captured with the microphone array.

6. An apparatus comprising at least one processor and at least one non-transitory memory including a computer program code, the at least one memory and the computer program code configured to, with the at least one processor, cause the apparatus at least to:

obtain at least one ambience component representation, the ambience component representation comprising at least one respective diffuse background audio signal and at least one parameter, the at least one parameter associated with the at least one respective diffuse background audio signal, at least one frequency range or at least one part of the at least one frequency range, at least one time period or at least one part of the at least one time period, and a directional range for a defined position within an audio field, wherein the at least one parameter comprises at least one parameter based, at least partially, on removal of directional audio components associated with at least one close audio signal, associated with an audio source, from at least one energy parameter determined based on analysis of at least two audio signals captured with a microphone array;

obtain at least one of: a rendering position, or a rendering direction within the audio field; and render at least one ambiance audio signal, comprising processing the at least one respective diffuse background audio signal based on the at least one parameter, and the at least one of: the rendering position, or the rendering direction relative to the defined position within the audio field.

7. The apparatus as claimed in claim 6, wherein the at least one of: the rendering position, or the rendering direction is within a 6-degrees-of-freedom or an enhanced 3-degrees-of-freedom audio field, wherein the rendered at least one ambiance audio signal is based on the at least one parameter and the at least one of: the rendering position, or the rendering direction within the 6-degrees-of-freedom or the enhanced 3-degrees-of-freedom audio field.

8. The apparatus as claimed in claim 7, wherein the at least one memory and the computer program code are configured to, with the at least one processor, cause the apparatus at least to:

render the at least one ambiance audio signal based on a distance defined with the at least one of: the rendering position, or the rendering direction within the audio field being over a minimum distance threshold;

render the at least one ambiance audio signal based on the distance defined with the at least one of: the rendering position, or the rendering direction within the audio field being under a maximum distance threshold; and render the at least one ambiance audio signal based on a distance weighting function applied to the distance defined with the at least one of: the rendering position, or the rendering direction within the audio field.

9. The apparatus as claimed in claim 7, wherein the at least one memory and the computer program code are configured to, with the at least one processor, cause the apparatus to:

determine the at least one of: the rendering position, or the rendering direction within the audio field, and wherein the rendered at least one ambiance audio signal is configured for rendering the at least one ambiance audio signal based on the at least one of: the rendering position, or the rendering direction being within the directional range.

10. A method comprising:

obtaining at least two audio signals captured with a microphone array;

analyzing the at least two audio signals to determine at least one energy parameter;

obtaining at least one close audio signal associated with an audio source;

removing directional audio components associated with the at least one close audio signal from the at least one energy parameter to generate at least one parameter; and defining at least one ambience component representation, the at least one ambience component representation comprising at least one respective diffuse background audio signal and the at least one parameter, the at least one parameter associated with the at least one respective diffuse background audio signal, at least one frequency range or at least one part of the at least one frequency range, at least one time period or at least one part of the at least one time period, and a directional range for a defined position within an audio field, wherein the at least one ambience component representation is configured to be used in rendering an ambiance audio signal, based on the at least one parameter of the at least one ambience component representation, the at least one respective diffuse background audio signal, and at least one of: a rendering position a rendering direction relative to the defined position.

11. The method as claimed in claim 10, wherein the at least one ambience component representation further comprises at least one of:

a minimum distance threshold, over which the at least one ambience component representation is configured to be used in rendering the ambiance audio signal;

a maximum distance threshold, under which the at least one ambience component representation is configured to be used in rendering the ambiance audio signal; or a distance weighting function, to be used in rendering the ambiance audio signal with a 6-degrees-of-freedom or an enhanced 3-degrees-of-freedom renderer, based on the at least one parameter of the at least one ambience component representation, the at least one of: the rendering position, or the rendering direction, and the at least one respective diffuse background audio signal.

12. The method as claimed in claim 10, wherein the directional range defines a range of angles.

13. The method as claimed in claim 10, further comprising:

generating the at least one respective diffuse background audio signal of the ambience component representation based on the at least two audio signals captured with the microphone array and the at least one close audio signal.

14. The method as claimed in claim 13, wherein generating the at least one respective diffuse background audio signal comprises at least one of:

downmixing the at least two audio signals captured with the microphone array;

selecting at least one audio signal from the at least two audio signals captured with the microphone array; or beamforming the at least two audio signals captured with the microphone array.

15. A method comprising:

obtaining at least one ambience component representation, the ambience component representation comprising at least one respective diffuse background audio signal and at least one parameter, the at least one parameter associated with the at least one respective diffuse background audio signal, at least one frequency range or at least one part of the at least one frequency range, at least one time period or at least one part of the at least one time period, and a directional range for a defined position within an audio field, wherein the at least one parameter comprises at least one parameter based, at least partially, on removal of directional audio components associated with at least one close audio signal, associated with an audio source, from at least one energy parameter determined based on analysis of at least two audio signals captured with a microphone array;

obtaining at least one of: a rendering position, or a rendering direction within an audio field; and rendering at least one ambiance audio signal, comprising processing the at least one respective diffuse background audio signal based on the at least one parameter, and the at least one of: the rendering position, or the rendering direction relative to the defined position within the audio field.

16. The method as claimed in claim 15, wherein the at least one of: the rendering position, or the rendering direction is within a 6-degrees-of-freedom or an enhanced 3-degrees-of-freedom audio field, and wherein the rendered at least one ambiance audio signal is based on the at least one parameter and the at least one of: the rendering position, or the rendering direction within the 6-degrees-of-freedom or the enhanced 3-degrees-of-freedom audio field.

17. The method as claimed in claim 16 further comprising:

rendering the at least one ambiance audio signal based on a distance defined with the at least one of: the rendering position, or the rendering direction within the audio field being over a minimum distance threshold;

rendering the at least one ambiance audio signal based on the distance defined with the at least one of: the rendering position, or the rendering direction within the audio field being under a maximum distance threshold; and rendering the at least one ambiance audio signal based on a distance weighting function applied to the distance defined with the at least one of: the rendering position, or the rendering direction within the audio field.

18. The method as claimed in claim 17, further comprising:

determining the at least one of: the rendering position, or the rendering direction within the audio field, and wherein the rendered at least one ambiance audio signal is configured for rendering the at least one ambiance signal based on the at least one of: the rendering position, or the rendering direction being within the directional range.

* * * * *